US012701421B2

(12) United States Patent
Lall et al.

(10) Patent No.: US 12,701,421 B2
(45) Date of Patent: Aug. 4, 2026

(54) METHOD AND SYSTEM TO PROTECT CLEAR TEXT TRANSMISSION OF USER IDENTITY IN WIRELESS NETWORKS

(71) Applicant: Indian Institute of Technology Delhi, New Delhi (IN)

(72) Inventors: Brejesh Lall, New Delhi (IN); Dhiman Saha, Chattisgarh (IN); Anand Madhavrao Baswade, Chattisgarh (IN); Pabitra Pal, New Delhi (IN); Aman Verma, New Delhi (IN)

(73) Assignee: Indian Institute of Technology Delhi, New Delhi (IN)

( * ) Notice: Subject to any disclaimer, the term of this patent is extended or adjusted under 35 U.S.C. 154(b) by 304 days.

(21) Appl. No.: 18/543,977

(22) Filed: Dec. 18, 2023

(65) Prior Publication Data

US 2024/0224046 A1      Jul. 4, 2024

(51) Int. Cl.
| | |
|---|---|
| *H04W 12/42* | (2021.01) |
| *H04W 8/20* | (2009.01) |
| *H04W 12/06* | (2021.01) |

(52) U.S. Cl.
CPC ........... *H04W 12/42* (2021.01); *H04W 8/205* (2013.01); *H04W 12/06* (2013.01)

(58) Field of Classification Search
CPC ...... H04W 12/42; H04W 8/205; H04W 12/06
See application file for complete search history.

(56) References Cited

U.S. PATENT DOCUMENTS

| | | | | |
|---|---|---|---|---|
| 2022/0272534 A1* | 8/2022 | Torvinen | ............... | H04L 9/3066 |
| 2023/0224704 A1* | 7/2023 | Atarius | ................. | H04L 9/3239 |
| | | | | 726/6 |

(Continued)

FOREIGN PATENT DOCUMENTS

| | | | | |
|---|---|---|---|---|
| CN | 102124767 A | * | 7/2011 | ......... H04L 63/0407 |

OTHER PUBLICATIONS

3rd Generation Partnership Project (3GPP), "Technical Specification Group Services and System Aspects; Security architecture and procedures for 5G system (Release 17)" TS 33.501, V17.5.0 (Mar. 2022).
3rd Generation Partnership Project (3GPP), "Technical Specification Group Services and System Aspects; 3G security; Lawful interception requirements (Release 18)" TS 33.106 V18.0.0 (Mar. 2024).

*Primary Examiner* — Erika A Washington
(74) *Attorney, Agent, or Firm* — SoCal IP Law Group LLP; Mark Andrew Goldstein

(57) ABSTRACT

The present disclosure provides a method to protect clear text transmission of user identity in wireless networks. The method includes sending a registration request to a Home Network (HN) to start an authentication process of a User Equipment (UE). In addition, the method includes receiving a subscription concealed identifier (SUCI) at the server network (SN). Further, the method includes generating a Subscription permanent identifier (SUPI) and a privacy key. The Subscription permanent identifier (SUPI) is de-concealed from the subscription concealed identifier (SUCI). Furthermore, the method includes generating and mapping, a virtual Subscription permanent identifier (SUPI) corresponding to the received Subscription permanent identifier (SUPI). Also, the method includes generating and sending, an authentication vector (AV) to the server network (SN). The response message includes the virtual Subscription permanent identifier (SUPI). The server network (SN) generates a globally unique temporary identifier (GUTI).

9 Claims, 5 Drawing Sheets

300

(56)     References Cited

U.S. PATENT DOCUMENTS

2023/0262463 A1*   8/2023   Kunz  .................. H04L 63/1475
                                                                           455/410
2025/0203353 A1*   6/2025   Wang  ................... H04W 12/06

* cited by examiner

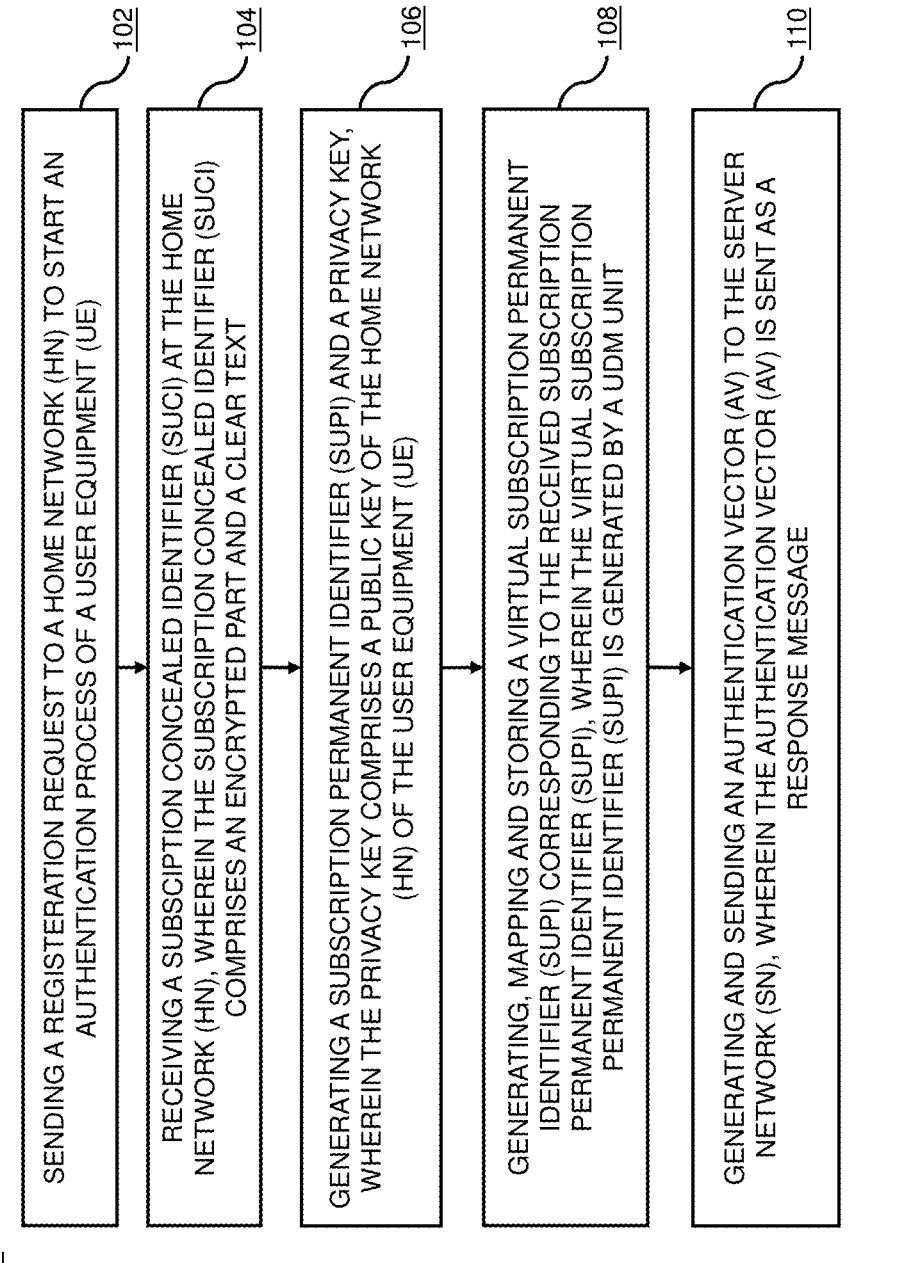

100

SENDING A REGISTERATION REQUEST TO A HOME NETWORK (HN) TO START AN AUTHENTICATION PROCESS OF A USER EQUIPMENT (UE)

102

RECEIVING A SUBSCIPTION CONCEALED IDENTIFIER (SUCI) AT THE HOME NETWORK (HN), WHEREIN THE SUBSCRIPTION CONCEALED IDENTIFIER (SUCI) COMPRISES AN ENCRYPTED PART AND A CLEAR TEXT

104

GENERATING A SUBSCRIPTION PERMANENT IDENTIFIER (SUPI) AND A PRIVACY KEY, WHEREIN THE PRIVACY KEY COMPRISES A PUBLIC KEY OF THE HOME NETWORK (HN) OF THE USER EQUIPMENT (UE)

106

GENERATING, MAPPING AND STORING A VIRTUAL SUBSCRIPTION PERMANENT IDENTIFIER (SUPI) CORRESPONDING TO THE RECEIVED SUBSCRIPTION PERMANENT IDENTIFIER (SUPI), WHEREIN THE VIRTUAL SUBSCRIPTION PERMANENT IDENTIFIER (SUPI) IS GENERATED BY A UDM UNIT

108

GENERATING AND SENDING AN AUTHENTICATION VECTOR (AV) TO THE SERVER NETWORK (SN), WHEREIN THE AUTHENTICATION VECTOR (AV) IS SENT AS A RESPONSE MESSAGE

METHOD AND SYSTEM TO PROTECT CLEAR TEXT TRANSMISSION OF USER IDENTITY IN WIRELESS NETWORKS

NOTICE OF COPYRIGHTS AND TRADE DRESS

RELATED APPLICATION INFORMATION

This patent claims priority from Indian patent application Ser. No. 202211076776, filed Dec. 29, 2022, all of which are incorporated herein by reference in their entirety.

TECHNICAL FIELD

The present disclosure relates to a field of mobile communications in 3GPP networks. More specifically, the present disclosure relates to a method for protecting clear text transmission of user identity in wireless networks.

BACKGROUND

Network providers in telecommunications system assign each SIM card a special identification code, known in the 3GPP network parlance as an IMSI (International Mobile Subscriber Identity) in 4G networks and as SUPI (Subscription Permanent Identifier) in the 5G networks. Since the duo depend on a shared symmetric key, authentication between a user and their network provider can only happen after user identification. The IMSI/SUPI values, however can be used to monitor, locate, and identify users if they are transmitted over the radio access channel in plaintext.

To prevent this invasion of privacy, the visiting network issues the SIM card with temporary IDs known as Temporary Mobile Subscriber Identity (TMSI) for 3G networks based systems and a GUTI for 4G and 5G systems. Then, across the radio access link, identification is done using these regularly changing temporary IDs. A privacy-preserving identifier called Subscription Concealed Identifier (SUCI) contains the hidden SUPI. Using an ECIES-based protection scheme and the public key of the home network, that was securely sent to the USIM during the USIM registration, the UE creates the SUCI.

As per the Security architecture and procedures for 5G System—3GPP TS 33.501, V17.5.0 (2022-03), the transmission of SUPI in the clear text is permitted over various scenarios:

Between 5G core network entities of the same serving network domain.

Between 5G core network entities of the different serving network domains.

Between 5G and Evolved Packet System (EPS) core network entities, if it has the form of an IMSI.

When it comes to Lawful Intercept (LI), 3GPP systems abide by requirements in technical specifications TS 33.106. The visiting network must be able to enable the interception of all services without help from or visibility from the home network, according to this standard. The local service providers must be able to identify and monitor any specific mobile user within the country, per the requirements of the law enforcement authorities of practically every nation. One of the criteria that requires SUPI to be sent in clear text from the home network to the serving network following successful validation is LI. Permanent identity (SUPI) has been playing a crucial role in the whole telecommunication framework across various generations. SUPI in 5G is similar to the International Mobile Subscriber Identity (IMSI) in 4G/3G/2G. Yet, in certain situations, it is hazardous to transmit permanent identifiers in clear text as it increases the risk of assault or theft of user-identity data. An example of such attack may be especially the well-known IMSI-catching attack.

A state of the art attempt to avoid clear text transmission, a Subscription Concealed Identifier (SUCI) has been included into the 5G authentication process. As per example state of the art 5G network, the SUCI simply encrypts the SUPI, thereby rendering the SUPI non-accessible to an attacker. Subscription Permanent Identifier (SUPI) transfer through cleartext (without encryption by SUCI) between the home network and the serving network is permitted by the current 3rd Generation Partnership Project (3GPP) authentication method for 5G Authentication and Key Agreement (AKA). This is however dependent on a network environment that is only partially trusted and still results in the leakage of permanent identity, which may then lead to linkability and traceability. As may be understood, the 5G AKA protocol's use of SUCI is only permitted to the extent of protocol relating to communication between the user equipment and the Access and Mobility Management Function (AMF). There remain high risk prone instances where the present 3GPP standard allows for the transmission of SUPI in clear text without following AKA protocol.

There lies at least a need to resolve this problem. Some of existing researches provide a method to defend against IMSI-catching assaults known as pseudonym. However, the researches and current methods necessitate improvements in both the UE side and the home network side. This makes the conventional strategies questionable in terms of the feasibility of adoption.

In the light of the above stated discussion, there lies at least a need to provide a method for protecting clear text transmission of user identity in wireless networks.

OBJECT OF THE DISCLOSURE

At least an object of the present disclosure is to provide a method for protecting clear text transmission of user identity in wireless networks.

Yet Another object of the present disclosure is to improve security and privacy of a user during communicating between the home network and the server network.

SUMMARY

This summary is provided to introduce a selection of concepts in a simplified format that are further described in the detailed description of the invention. This summary is not intended to identify key or essential inventive concepts of the invention, nor is it intended for determining the scope of the invention.

In an aspect, the present disclosure provides a method to protect clear text transmission of user identity in wireless networks. The method includes sending a registration request to a Home Network (HN) to start an authentication process of a User Equipment (UE). A serving network (SN) sends the registration request to the home network (HN) for the authentication process. In addition, the method includes receiving a subscription concealed identifier (SUCI) at the home network (HN). The subscription concealed identifier (SUCI) includes an encrypted part and a clear text. The encrypted part of the subscription concealed identifier (SUCI) generated by the User Equipment (UE) identifies subscription of the home network. Further, the method includes generating a Subscription permanent identifier (SUPI) and a privacy key. The privacy key includes a public key of the home network of the User Equipment (UE). The privacy key includes an identifier of the home network (HN). The Subscription permanent identifier (SUPI) is de-concealed from the subscription concealed identifier (SUCI). The Subscription permanent identifier (SUPI) is in one or more formats. Furthermore, the method includes generating and mapping, a virtual Subscription permanent identifier (SUPI) corresponding to the received Subscription permanent identifier (SUPI). The virtual Subscription permanent identifier (SUPI) is generated by a Unified Data Management (UDM) unit. Also, the method includes generating and sending, an authentication vector (AV) to the server network (SN). The authentication vector (AV) is sent as a response message. The response message includes the virtual Subscription permanent identifier (SUPI). The server network (SN) generates a globally unique temporary identifier (GUTI).

To further clarify the advantages and features of the present invention, a more particular description of the invention will be rendered by reference to specific embodiments thereof, which is illustrated in the appended drawing. It is appreciated that these drawings depict only typical embodiments of the invention and are therefore not to be considered limiting its scope. The invention will be described and explained with additional specificity and detail with the accompanying drawings.

STATEMENT OF THE DISCLOSURE

The present disclosure provides a method to protect clear text transmission of user identity in wireless networks. The method includes sending a registration request to a Home Network (HN) to start an authentication process of a User Equipment (UE). A serving network (SN) sends the registration request to the home network (HN) for the authentication process. In addition, the method includes receiving a subscription concealed identifier (SUCI) at the home network (HN). The subscription concealed identifier (SUCI) includes an encrypted part and a clear text. The encrypted part of the subscription concealed identifier (SUCI) generated by the User Equipment (UE) identifies subscription of the home network. Further, the method includes generating a Subscription permanent identifier (SUPI) and a privacy key. The privacy key includes a public key of the home network of the User Equipment (UE). The privacy key includes an identifier of the home network (HN). The Subscription permanent identifier (SUPI) is de-concealed from the subscription concealed identifier (SUCI). The Subscription permanent identifier (SUPI) is in one or more formats. Furthermore, the method includes generating and mapping, a virtual Subscription permanent identifier (SUPI) corresponding to the received Subscription permanent identifier (SUPI). The virtual Subscription permanent identifier (SUPI) is generated by a Unified Data Management (UDM) unit. Also, the method includes generating and sending, an authentication vector (AV) to the server network (SN). The authentication vector (AV) is sent as a response message. The response message includes the virtual Subscription permanent identifier (SUPI). The server network (SN) generates a globally unique temporary identifier (GUTI).

DESCRIPTION OF THE DRAWINGS

Figure 2:
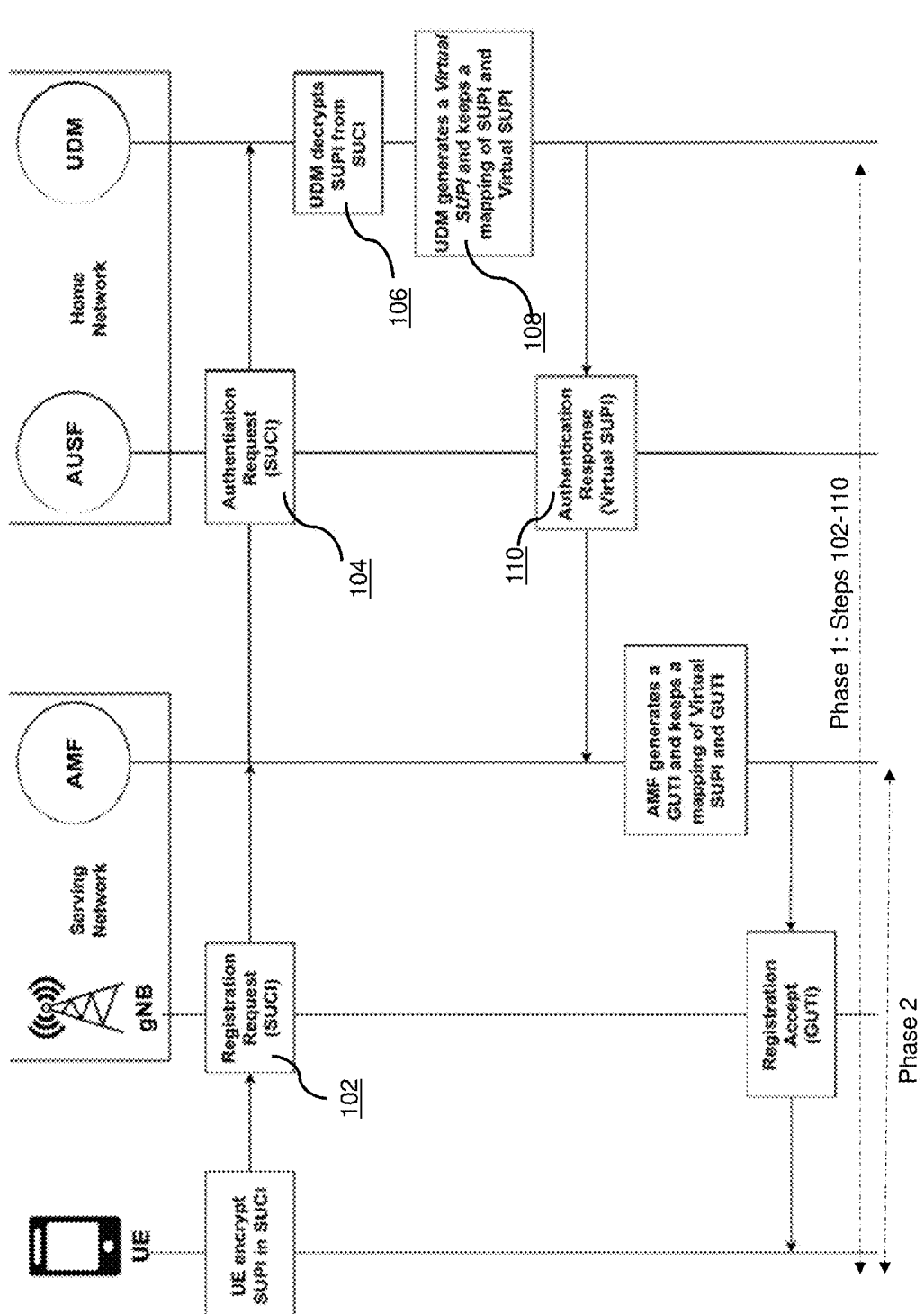
Figure 3:
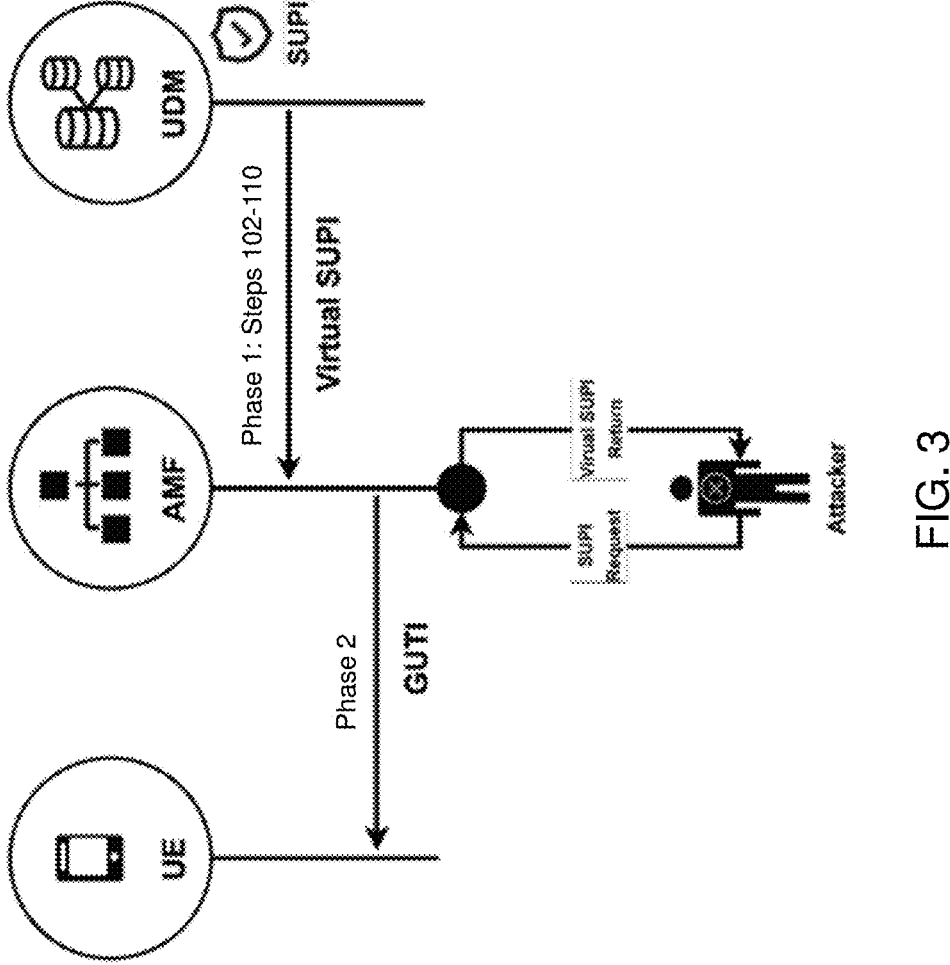
Figure 4:
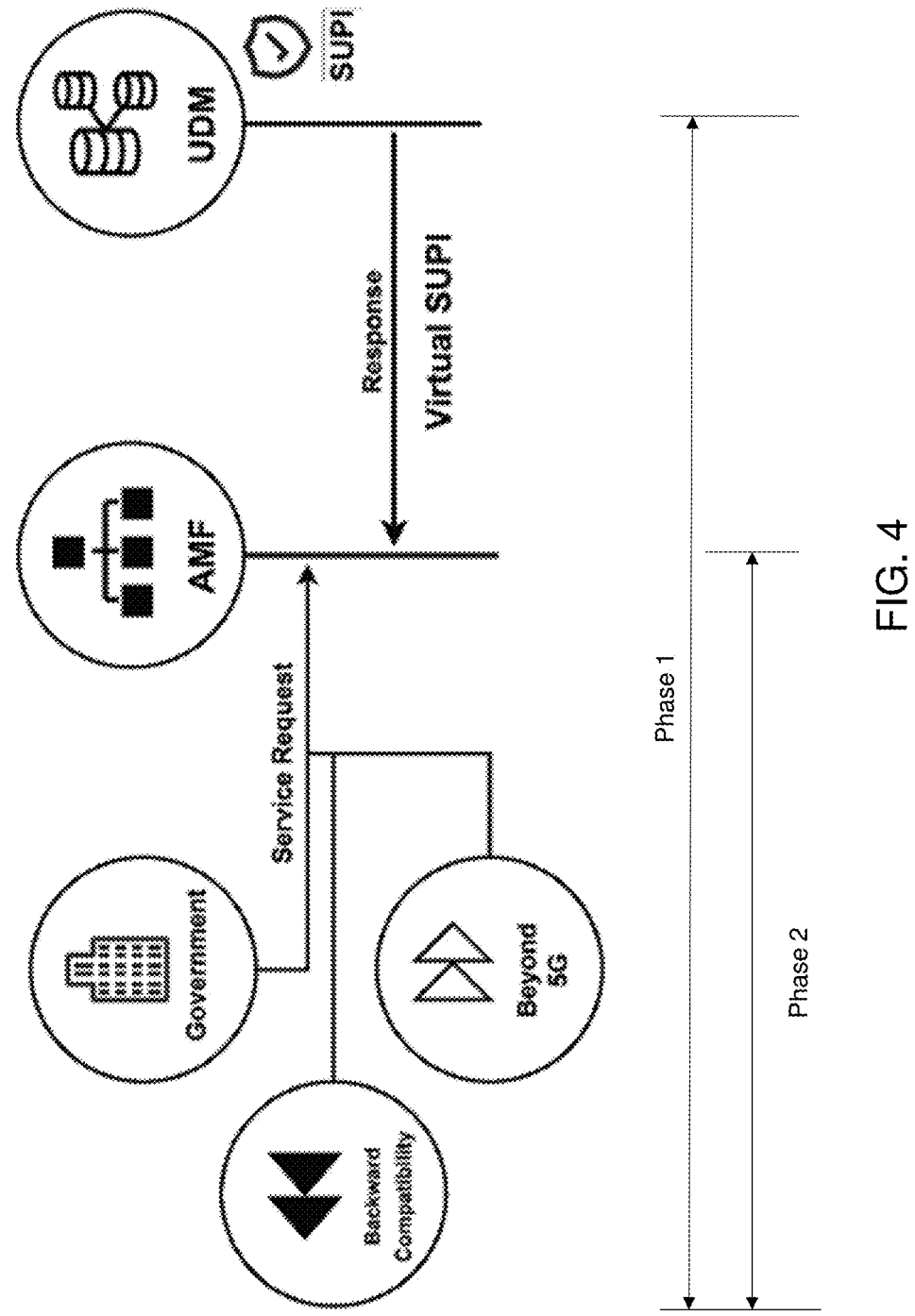
Figure 5:
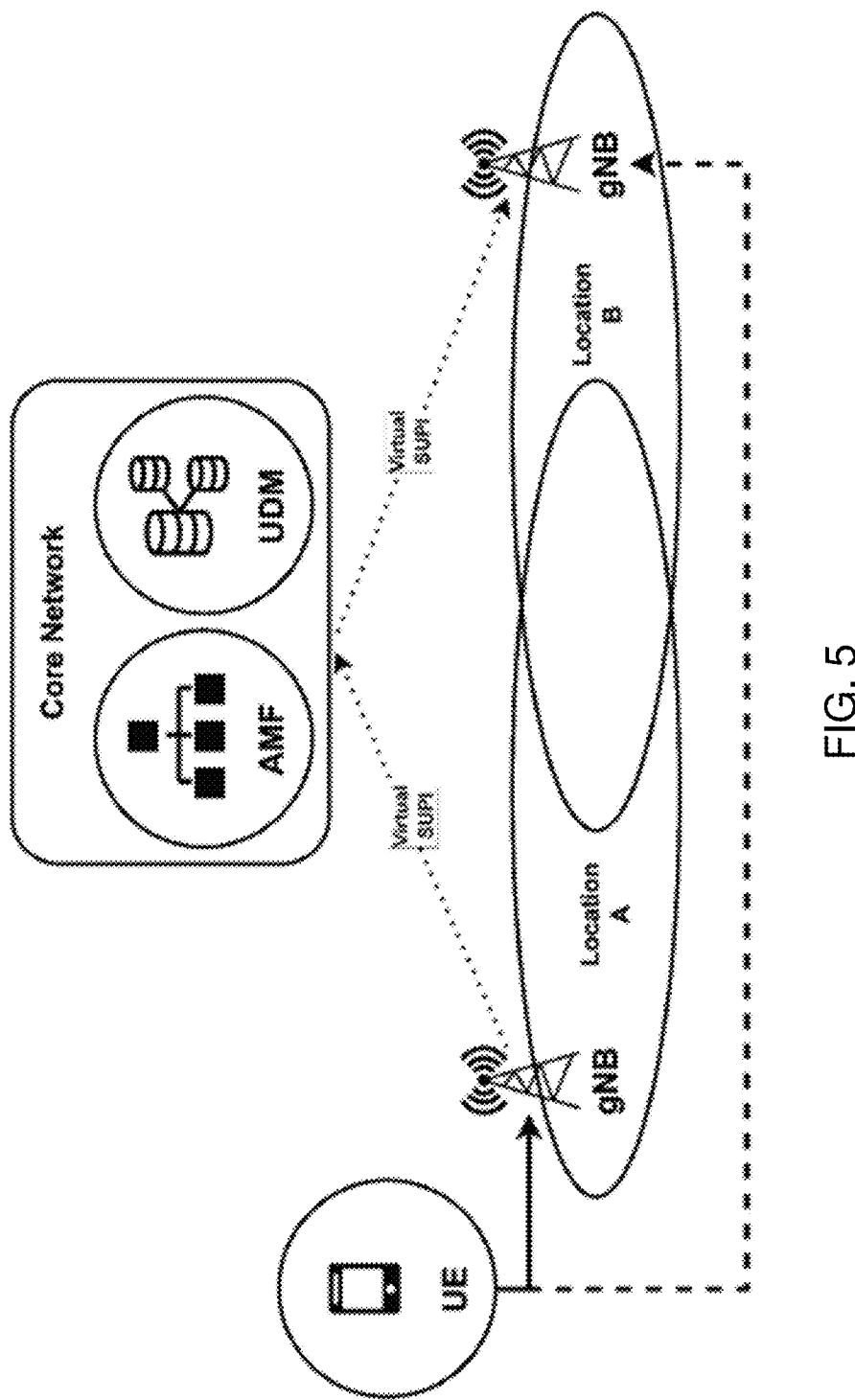

Having thus described the invention in general terms, reference will now be made to the accompanying drawings, which are not necessarily drawn to scale, and wherein:

FIG. 1 illustrates a block diagram depicting a method for protecting clear text transmission of user identity in wireless networks, in accordance with various embodiments of the present disclosure;

FIG. 2 illustrates a control flow diagram implementing the method of FIG. 1 in 3GPP wireless networks, in accordance with various embodiments of the present disclosure;

FIG. 3 illustrates another control flow diagram implementing the method of FIG. 1 in 3GPP wireless networks, in accordance with various embodiments of the present disclosure;

FIG. 4 illustrates yet another control flow diagram implementing the method of FIG. 1 in 3GPP wireless networks, in accordance with various embodiments of the present disclosure; and FIG. 5 illustrates yet another control flow diagram implementing the method of FIG. 1 in 3GPP wireless networks, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

The 5G-AKA authentication and key agreement protocol as a standard has been released by the 3GPP organization as Technical Specification (TS) 33.501 for the 5th generation (5G) mobile communication system. It introduces public key encryption to hide the SUPIs and improve the privacy of mobile users. Due to a security flaw in the operational and legal aspects of SUPI use as per said standard, the user's long-term identity is exposed.

The present subject matter at least offers a method to improve security and privacy when communicating between the serving network and the home network. Both legacy networks and partially trusted network entities are also construed to be beneficiary in accordance with the present subject matter.

FIG. 1 illustrates a block diagram 100 depicting a method for protecting clear text transmission of user identity in wireless networks, in accordance with various embodiments of the present disclosure. The block diagram includes the method steps 102, 104, 106, 108 and 110. The method steps occur in a sequence to perform the method for protecting clear text transmission of user identity in wireless networks.

In general, a wireless network includes a user equipment, a home network and a serving network. The user equipment and the home network may be connected to the server network. In addition, the user equipment and the home network exchange signals with the server network. In an embodiment of the present disclosure, the home network (HN) includes a mobile country code (MCC) and a mobile network code (MNC). In addition, the subscription identifier may be a mobile subscription identifier (MSIN). The user equipment may be configured with subscription identifier. The subscription identifier identifies a subscription supported by the home network and accesses the home network using the server network.

As may be known, 3GPP networks provide a service-based architecture for the core networks. The 5G AKA authentication procedure is divided into two phases:

Phase 1: 5G authentication initiation and selection of authentication method. The same has been covered based at-least on below mentioned steps 102 till 110.

Phase 2: Mutual authentication between the UE and the network.

At step 102, a registration request may be sent to a Home Network (HN) to start an authentication process of a User Equipment (UE). In an embodiment of the present disclosure, a serving network (SN) sends the registration request to the home network (HN) for the authentication process at an AUSF. At step 104, a subscription concealed identifier (SUCI) may be received at the home network (HN). In an embodiment of the present disclosure, the user equipment (UE) includes a tamper resistant secure hardware component to generate the subscription concealed identifier (SUCI). The subscription concealed identifier (SUCI) includes an encrypted part and a clear text. In addition, the encrypted part of the subscription concealed identifier (SUCI) generated by the User Equipment (UE) identifies subscription of the home network (HN).

At step 106, a Subscription permanent identifier (SUPI) and a privacy key may be generated at a Unified Data Management (UDM) within the home network. The privacy key includes a public key of the home network of the User Equipment (UE). The privacy key includes an identifier of the home network (HN). In an embodiment of the present disclosure, the Subscription permanent identifier (SUPI) may be de-concealed from the subscription concealed identifier (SUCI). In addition, the Subscription permanent identifier (SUPI) may be in one or more formats. The one or more formats of the Subscription permanent identifier (SUPI) may be International Mobile Subscriber Identifiers (IMSI). In an embodiment of the present disclosure, the Subscription permanent identifier (SUPI) generated may be in clear text form.

In an embodiment of the present disclosure, the privacy key may be stored in a 5G-USIM/UICC. In an embodiment of the present disclosure, the public key may be a privacy key that includes one or more keys to maintain subscription privacy of the user equipment. In addition, the privacy key may or may not be used to generate the subscription concealed identifier (SUCI). The generation of the subscription concealed identifier (SUCI) requires the use of one or more privacy keys. In general, a user equipment sends a request to a 5G USIM to activate or update privacy key. The request includes a SUPI. The 5G-USIM/UICC accepts the subscription and transmits an acknowledgement to the UE in response.

At step 108, a virtual Subscription permanent identifier (SUPI) is generated corresponding to the received Subscription permanent identifier (SUPI). The virtual Subscription permanent identifier (SUPI) may be generated by a UDM unit as a Virtual SUPI corresponding to the received SUPI and a mapping there-between is kept. In general, the UDM may be responsible for generating one or more credentials for authentication of a network. In addition, the UDM authorizes access of subscription.

At step 110, an authentication vector (AV) comprising the virtual SUPI may be generated and sent to the server network (SN). In an embodiment of the present disclosure, the authentication vector (AV) may be sent as a response message to the authentication request.

In an embodiment, the response message includes the virtual Subscription permanent identifier (SUPI). As a part of Phase 2 operation, the server network (SN) generates a globally unique temporary identifier (GUTI). In general, a globally unique temporary identifier (GUTI) may be a temporary ID known as temporary mobile subscriber identity (TMSI) for 4G and 5G systems. Thereafter, the 5G AKA authentication is concluded as per 3GPP standard based on the GUTI. Specifically, the authentication of any user equipment (UE) is concluded in response to the registration request raise vide step 102.

At least an example application in accordance with the present subject matter emerges in a migration scenario where the SN is in one country (A) and the HN is in another (B). If a country has a regulatory need for SUPI identification of LI targets, the operator of the SN must enter into roaming agreements with the operator of the HN. Under state of the art circumstances, throughout the agreement, every disclosure of SUPI remains vulnerable to linkability and traceability attacks. The present subject matter facilitates security of the agreement by exposing merely the virtual identity, which complies with all legal requirements of lawful interception and still preserves the user's true identity.

FIG. 2 illustrates a control flow diagram implementing the method steps 102-110 of FIG. 1 in 3GPP based wireless network 200, in accordance with various embodiments of the present disclosure. As may be observed, the control flow diagram follows the sequence of method of FIG. 1 in respect of the various networking nodes (i.e. UE, gNB, AMF, AUSF, UDM etc.) of home network and the server network forming a part of the 3GPP based wireless network 200. Each of the node may be construed as comprising a transceiver and processor.

At step 102, the serving network (SN) comprising the gNB and the AMF sends a registration request at the Home Network (HN) to start an authentication process of a User Equipment (UE). At step 104, a subscription concealed identifier (SUCI) is received at the home network (HN) comprising the AUSF and the UDM, wherein the subscription concealed identifier (SUCI) comprises an encrypted part and a clear text. The encrypted part of the subscription concealed identifier (SUCI) generated by the User Equipment (UE) identifies subscription of the home network (HN). At step 106, the UDM generates the Subscription permanent identifier (SUPI) and the privacy key, wherein the privacy key comprises a public key of the home network of the User Equipment (UE) and an identifier of the home network (HN). The Subscription permanent identifier (SUPI) is generated based on decrypting the subscription concealed identifier (SUCI). At step 108, the UDM maps the virtual Subscription permanent identifier with the received Subscription permanent identifier (SUPI).

At step 110, the AUSF at the home network (HN) generates and sends an authentication vector (AV) to a server network (SN), wherein the authentication vector (AV) is sent as a response message comprising the virtual Subscription permanent identifier. Thereafter, the AMF at the server network (SN) generates a globally unique temporary identifier (GUTI) in response therefrom.

The present implementation at least provides a method to improve security and privacy when communicating between the serving network and the home network and serving network communication in existing 5G AKA. Both legacy networks and partially trusted network entities can benefit from the proposed subject matter. Further, the present subject matter provides a low-cost security solution which adheres with the existing 5G AKA authentication mechanism with minimal modifications.

FIG. 3 illustrates another control flow diagram implementing the method of FIG. 1 in 3GPP wireless networks 300, in accordance with various embodiments of the present disclosure. The present implementation depicts a sequential operation in respect of Phase 1 and Phase 2. The same at least results in doing away with the user's susceptibility to identity leaks through linkability and traceability attacks. Even if an attacker were to intercept the HN and SN connection, they would only be able to catch a Virtual SUPI, which would not expose the user's true identity.

In an embodiment of the present disclosure and in accordance with the phase 2 operation, the user equipment or UE responds only to the virtual Subscription permanent identifier (SUPI) or globally unique temporary identifier (GUTI). In addition, the user equipment restricts response to any other visiting server network. In case of scenario pertaining to attack on data communication, the visiting server network may perform one or more fraudulent activities. The attacker is at best able to catch the virtual Subscription permanent identifier (SUPI) upon intercepting the home network (HN) and the server network (SN), and true identity of the user, i.e. an original SUPI remains unrevealed. The restriction from one or more fraudulent activities and the generation of the virtual Subscription permanent identifier (SUPI) improves security and privacy of a user during communicating between the home network (HN) and the server network (SN).

FIG. 4 illustrates yet another control flow diagram implementing the method of FIG. 1 in 3GPP wireless networks

400, in accordance with various embodiments of the present disclosure. The present subject matter complies with legal requirements by allowing law enforcement to find and follow users based on the original SUPI. The law enforcement agencies of almost all countries require that their local service providers should have the capability to locate and track any particular mobile user within the country. In an embodiment of the present disclosure, the mapping information may be stored in a UDM as part of Phase 1 operation. Any law enforcement may be able to track and monitor the user by creating a successful match between tracking request's virtual Subscription permanent identifier (SUPI) and the Subscription permanent identifier (SUPI) at the UDM.

Furthermore, the present subject matter stands operable in private 5G and beyond networks. With the invention implementation in 5G, all entities supporting the 5G radio interface are compatible with execution of the method steps 102-110 with no backward compatibility related problems. For instance, the UE is operable to not respond to requests from visited serving networks for their SUPI, but would instead use only the Virtual SUPI or Globally Unique Temporary Identifier (GUTI).

FIG. 5 illustrates yet another implementation of the method of FIG. 1 in 3GPP wireless networks 500, in accordance with various embodiments of the present disclosure. The present subject matter renders cost-effective solution since minimal modifications are required on the UDM side. It covers the roaming, migration scenarios which sometimes proves to be a costly process. Additionally, the present subject matter largely retains 5G AKA's general call flow system. The proposed subject matter accordingly provides ease of adoption in existing 5G architecture.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

It is claimed:

1. A method to protect clear text transmission of user identity in wireless networks comprising one or more 3GPP network nodes, the method comprising:

generating, a virtual Subscription permanent identifier corresponding to a received Subscription permanent identifier (SUPI), wherein the virtual Subscription permanent identifier is generated by a Unified Data Management (UDM) in a home network (HN);

mapping, the virtual Subscription permanent identifier with the received Subscription permanent identifier (SUPI); and generating and sending, an authentication vector (AV) to a server network (SN), wherein the authentication vector (AV) is sent as a response message comprising the virtual Subscription permanent identifier, and wherein the server network (SN) generates a globally unique temporary identifier (GUTI), wherein the generation of the virtual Subscription permanent identifier (SUPI) facilitates communication between the home network (HN) and the server network (SN) in accordance with a 5G AKA protocol.

2. The method to protect clear text transmission of user identity in wireless networks as recited in claim 1, wherein the Subscription permanent identifier (SUPI) is generated at the Home Network (HN) by:

receiving, a registration request at the Home Network (HN) to start an authentication process of a User Equipment (UE), wherein the server network (SN) sends the registration request to the home network (HN) for the authentication process;

receiving (104), a subscription concealed identifier (SUCI) at the home network (HN), wherein the subscription concealed identifier (SUCI) comprises an encrypted part and a clear text, wherein the encrypted part of the subscription concealed identifier (SUCI) generated by the User Equipment (UE) identifies subscription of the home network (HN); and generating, a Subscription permanent identifier (SUPI) and a privacy key, wherein the privacy key comprises a public key of the home network of the User Equipment (UE); wherein the privacy key comprises an identifier of the home network (HN), wherein the Subscription permanent identifier (SUPI) is generated based on decrypting from the subscription concealed identifier (SUCI), wherein the Subscription permanent identifier (SUPI) is in one or more formats.

3. The method to protect clear text transmission of user identity in wireless networks as recited in claim 2, wherein the one or more formats of the Subscription permanent identifier (SUPI) are International Mobile Subscriber Identifiers (IMSI).

4. The method to protect clear text transmission of user identity in wireless networks as recited in claim 1, wherein the mapping information is stored in the UDM.

5. The method to protect clear text transmission of user identity in wireless networks as recited in claim 1, wherein the virtual Subscription permanent identifier (SUPI) generated at the UDM is in a clear text form.

6. The method to protect clear text transmission of user identity in wireless networks as recited in claim 1, wherein the home network (HN) consists of a mobile country code (MCC) and a mobile network code (MNC) and wherein the subscription permanent identifier is a mobile subscription identifier (MSIN).

7. The method to protect clear text transmission of user identity in wireless networks as recited in claim 1, wherein a successful match between the virtual Subscription permanent identifier (SUPI) and the Subscription permanent identifier (SUPI) at the UDM causes tracking and monitoring of the user.

8. A method to protect clear text transmission of user identity in wireless networks comprising one or more 3GPP network nodes, the method comprising:

generating, a virtual Subscription permanent identifier corresponding to a received Subscription permanent identifier (SUPI), wherein the virtual Subscription permanent identifier is generated by a Unified Data Management (UDM) in a home network (HN);

mapping, the virtual Subscription permanent identifier with the received Subscription permanent identifier (SUPI); and generating and sending, an authentication vector (AV) to a server network (SN), wherein the authentication vector (AV) is sent as a response message comprising the virtual Subscription permanent identifier, and wherein the server network (SN) generates a globally unique temporary identifier (GUTI), wherein the virtual Subscription permanent identifier (SUPI) is accessed upon intercepting the home network (HN) and the server network (SN) and wherein the Subscription permanent identifier (SUPI) of the user is unrevealed during the intercepting.

9. A telecommunication node to protect clear text transmission of user identity in 3GPP wireless network, the node comprising:

a transceiver;

a processor coupled to the transceiver and configured to:

generate, a virtual Subscription permanent identifier corresponding to a received Subscription permanent identifier (SUPI), wherein the virtual Subscription permanent identifier is generated by a Unified Data Management (UDM) at a home network (HN);

map, the virtual Subscription permanent identifier with the received Subscription permanent identifier (SUPI); and generate and send, an authentication vector (AV) to a server network (SN), wherein the authentication vector (AV) is sent as a response message, wherein the response message comprises the virtual Subscription permanent identifier, and wherein the server network (SN) generates a globally unique temporary identifier (GUTI), wherein the generation of the virtual Subscription permanent identifier (SUPI) facilitates communication between the home network (HN) and the server network (SN) in accordance with a 5G AKA protocol.

* * * * *